(12) United States Patent
Stewart et al.

(10) Patent No.: US 10,904,588 B1
(45) Date of Patent: *Jan. 26, 2021

(54) STITCHING CONTENT STREAMS TOGETHER

(71) Applicant: Amazon Technologies, Inc., Seattle, WA (US)

(72) Inventors: Nathaniel Stewart, Seattle, WA (US); Lei Li, Kirkland, WA (US); Mairo Pedrini, Shoreline, WA (US); Patrick Joseph Lewis, Seattle, WA (US); Ravindra Ganti, Sammamish, WA (US); Parminder Singh, Seattle, WA (US); Gaurav Saxena, Seattle, WA (US); Kent Haakan Karlsson, Issaquah, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,642

(22) Filed: Mar. 8, 2019

Related U.S. Application Data

(63) Continuation of application No. 15/933,144, filed on Mar. 22, 2018, now Pat. No. 10,277,924.

(51) Int. Cl.
*H04N 21/234* (2011.01)
*H04N 21/2187* (2011.01)
*H04N 21/442* (2011.01)

(52) U.S. Cl.
CPC ... *H04N 21/23424* (2013.01); *H04N 21/2187* (2013.01); *H04N 21/442* (2013.01)

(58) Field of Classification Search
CPC ......... H04N 21/23424; H04N 21/2187; H04N 21/442
See application file for complete search history.

(56) References Cited

U.S. PATENT DOCUMENTS

| | | |
|---|---|---|
| 8,595,186 B1 | 11/2013 | Mandyam et al. |
| 8,832,297 B2 | 9/2014 | Soroushian et al. |
| 9,866,459 B1 | 1/2018 | Joliveau et al. |
| 2006/0023962 A1 | 2/2006 | Hwang et al. |
| 2007/0171921 A1 | 7/2007 | Wookey et al. |
| 2009/0287886 A1 | 11/2009 | Karstens |
| 2010/0100899 A1 | 4/2010 | Bradbury et al. |
| 2011/0083037 A1* | 4/2011 | Bocharov ........ H04N 21/23116 714/4.11 |
| 2012/0072272 A1* | 3/2012 | Kilar ..................... G06Q 30/02 705/14.4 |
| 2012/0311174 A1 | 12/2012 | Bichot et al. |
| 2015/0271232 A1 | 9/2015 | Luby et al. |

(Continued)

OTHER PUBLICATIONS

U.S. Notice of Allowance dated Nov. 9, 2017 issued in U.S. Appl. No. 15/061,890.

(Continued)

*Primary Examiner* — Benjamin R Bruckart
*Assistant Examiner* — Tien M Nguyen
(74) *Attorney, Agent, or Firm* — Weaver Austin Villeneuve & Sampson LLP

(57) ABSTRACT

Methods and apparatus are described for stitching independently encoded content streams together such that they appear to be part of a single streaming session.

18 Claims, 4 Drawing Sheets

(56) References Cited

U.S. PATENT DOCUMENTS

2016/0112484 A1\* 4/2016 Liu
2016/0269765 A1 9/2016 Mandyam
2017/0366833 A1\* 12/2017 Amidei ............ H04N 21/23439
2018/0343482 A1\* 11/2018 Loheide ............. H04N 21/2393

OTHER PUBLICATIONS

U.S. Office Action dated Sep. 21, 2018 issued in U.S. Appl. No. 15/933,144.
U.S. Notice of Allowance dated Jan. 23, 2019 issued in U.S. Appl. No. 15/933,144.
U.S. Appl. No. 15/933,144, filed Mar. 22, 2018, Stewart et al.
"Information technology—Dynamic adaptive streaming over HTTP (DASH)—Part 1: Media presentation description and segment formats" *ISO/IEC 23009-1*, Second edition, May 15, 2014.

\* cited by examiner

STITCHING CONTENT STREAMS TOGETHER

INCORPORATION BY REFERENCE

An Application Data Sheet is filed with this specification as part of this application. Each application to which this application claims benefit or priority as identified in the Application Data Sheet is incorporated herein by reference in its entirety and for all purposes.

BACKGROUND

Live streaming content, also referred to as broadcast content, includes channels or feeds with scheduled content (e.g., premium movie channels) as well as live broadcasts (e.g., sporting events, news, etc.). Unlike video-on-demand (VOD) content, live content may not have a distinct end point and may continue indefinitely. In addition, VOD content may be buffered or otherwise stored in client devices well in advance of the client playhead (i.e., the content fragment currently being rendered by the client). This is typically not the case for live content because of the fact that the delay between the live playhead (i.e., the latest content fragment available) and the client playhead may be only a few seconds, as well as the fact that the live content is sometimes generated in real time and therefore may not yet exist.

An origin stack is the set of transcoding, digital rights management (DRM), and media processing hardware and software resources that generates encoded content from a live content source for streaming to client devices. Multiple origin stacks for the same content may be provisioned for redundancy and load balancing purposes. If one of the stacks fails, all of the sessions relying on that stack need to connect to streams originating from a different stack. The typically short amount of time between the live and client playheads, and the number of client devices that may be consuming streams originating from a particular origin stack make such failovers technically challenging, and often result in undesirable impacts on the end user experience, e.g., rebuffering events or connection failures.

DETAILED DESCRIPTION

This disclosure describes techniques for stitching independently encoded and/or packaged content streams together such that they appear from the perspective of the client device to be part of a single streaming session. This is useful in the context of origin stack failover in that the effect on the end user's experience can be dramatically improved relative to failover scenarios in which the client device needs to terminate its current streaming session and establish a new session to migrate from one stack to another. More generally, the techniques enabled by the present disclosure enable the stitching together of content streams representing different versions of the same content or even different content for a variety of purposes. An example will be instructive.

Figure 1A:
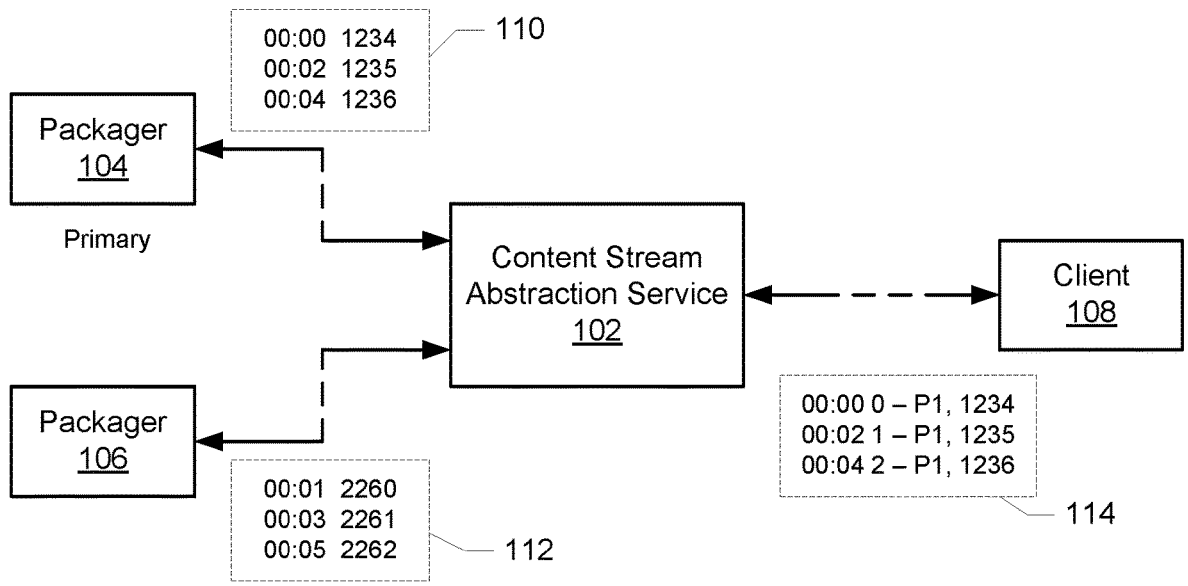
FIGS. 1A and 1B illustrate an example in which a client device consumes content originating from different packagers as enabled by the present disclosure.

FIG. 1A shows a content stream abstraction service 102 that receives content fragments and metadata for the content streams generated by two different packagers 104 and 106, and provides manifest data to a media player (not shown) on client device 108 so that client device 108 can generate requests for content fragments. Note that the content delivery pipeline has been greatly simplified (as represented by the dashed lines) for illustrative purposes. In this example, packagers 104 and 106 package independently encoded versions of the same content for the purpose of redundancy and failover.

The fragments of the content stream generated by packager 104 (represented by dashed box 110) have indices 1234, 1235, and 1236, having media time stamps of 00:00, 00:02, and 00:04, respectively. The fragments of the content stream generated by packager 106 (represented by dashed box 112) have indices 2260, 2261, and 2262, having media time stamps of 00:01, 00:03, and 00:05, respectively. Note that because the fragments of each content stream represent the same source content they reference a common timeline. However, because they are independently encoded and packaged, their media time stamps may not align, and their indices may be completely unrelated.

Initially, content stream abstraction service 102 designates packager 104 as the primary packager (e.g., for the geographic region in which client 108 is located). Service 102 then provides manifest data (represented by dashed box 114) to client device 108 that includes fragment references corresponding to the fragments of the content stream of packager 104. Using this manifest data, the player on client device 108 generates content fragment requests that correspond to content fragments from packager 104 and begins consuming that content stream. As illustrated in dashed box 114, service 102 uses its own fragment indices 0, 1, and 2; a numbering scheme it also uses for the fragments from packager 106 as derived, for example, from the media timeline common to both streams.

Figure 1B:
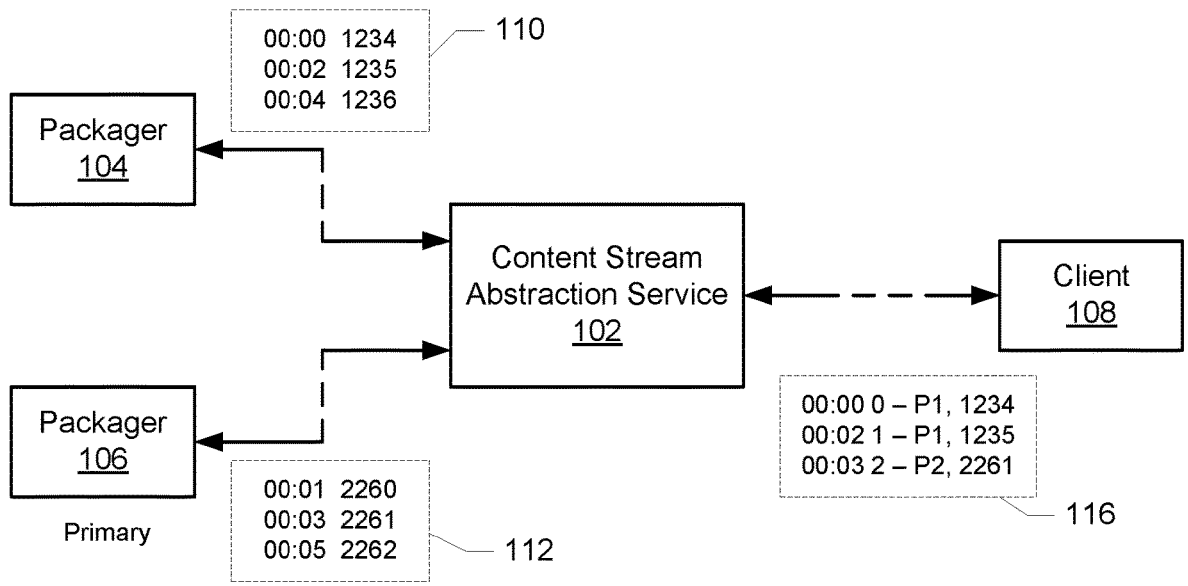

FIG. 1B shows what happens if it is determined that client device 108 should switch at 00:03 to the content stream corresponding to packager 106. This might occur, for example, because one or more of the components of the origin stack in which packager 104 is included is not operating reliably. To cause the switch to happen, effectively stitching the two streams together, service 102 provides updated manifest data (represented by dashed box 116) to the player on client device 108 which includes references to fragments originating from both packager 104 and packager 106, i.e., fragments with indices 1234, 1235, and 2261, and having media time stamps of 00:00, 00:02, and 00:03, respectively. As illustrated in dashed box 116, fragment 2261, which was also assigned index 2 by service 102 is selected as the next fragment reference by service 102 based on its media time stamp.

The updated manifest data also indicates to the player on client device 108 that there is a discontinuity in the content, e.g., an overlap of fragments 1235 and 2261. Based on this indication, the discontinuity is automatically handled by the logic of player according to the streaming protocol being used (e.g., DASH, Smooth Streaming, or HLS), and consumption of the content continues, but now with the player requesting fragments that originate from packager 106. In this way, the switch from the content stream of packager 104 to the content stream of packager 106 is effectively transparent to the player on client device 108.

Figure 2:
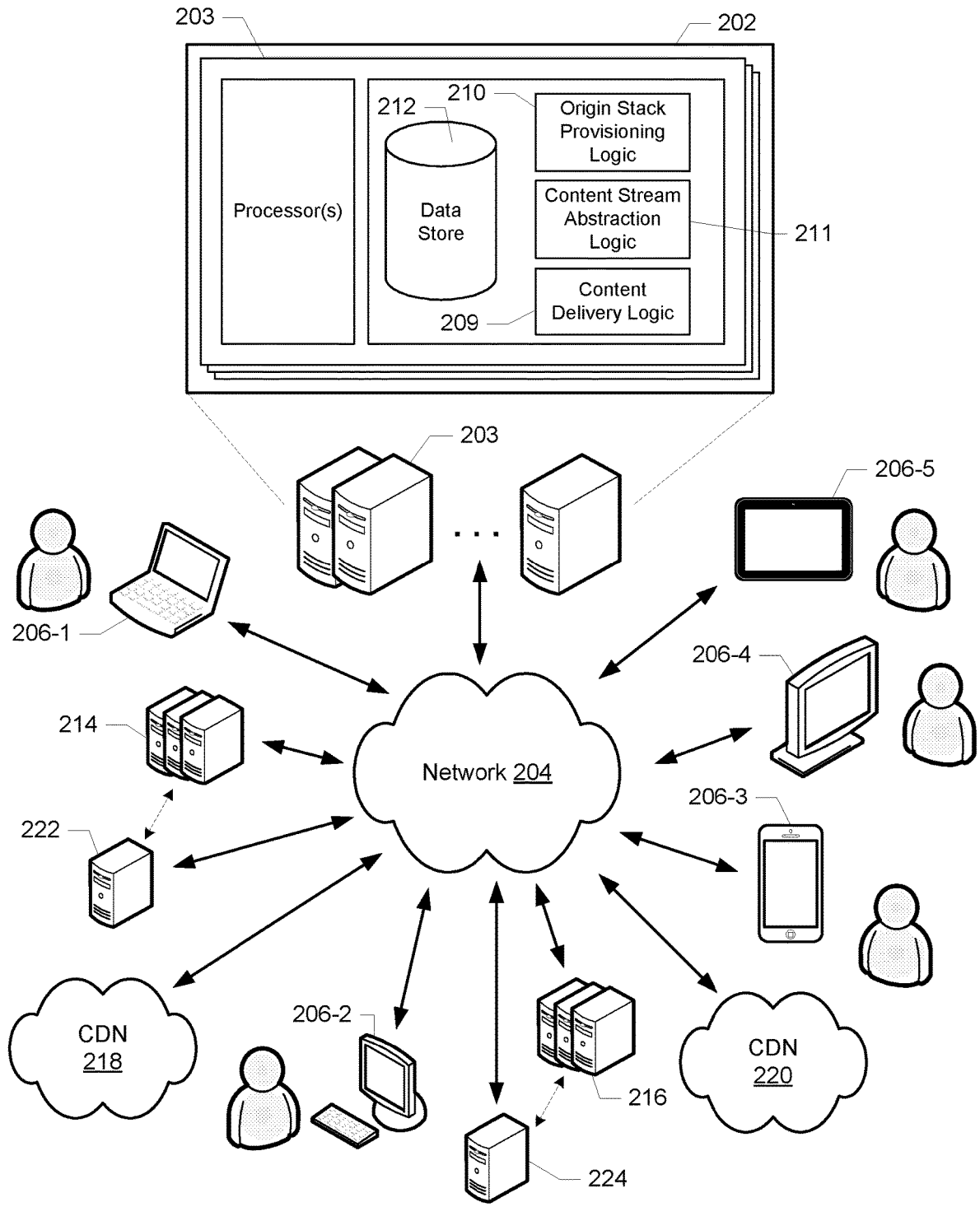
FIG. 2 depicts an example of a computing environment in which implementations enabled by the present disclosure may be practiced.

FIG. 2 illustrates an example of a computing environment in which a video content service 202 provides streaming content (e.g., video and/or audio) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services) to provision origin stacks and provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In some of the examples herein, content service 202 is described as providing access to live content using multiple, redundant origin stacks (e.g., origin stacks 214 and 216) in conjunction with one or more content delivery networks (e.g., CDNs 218 and 220) that may or may not be independent of content service 202. As will be appreciated, content service 202 may be integrated to varying degrees with the platforms and/or networks in which the origin stack resources and/or CDNs operate. For example, one or more origin stacks may be integrated with or in the same co-location facility or data center as content service 202. Alternatively, origin stacks may be in facilities that are remote from that in which content service 202 operates. In another example, an origin stack may be in the same network or facility as a CDN that is streaming its content. The range of variations known to those of skill in the art are contemplated to be within the scope of this disclosure.

Content service 202 includes logic that facilitates at least some aspects of the delivery of streaming content to client (e.g., as represented by content delivery logic 209). Content service 202 also includes logic that facilitates the provisioning of origin stacks (e.g., logic 210) and the abstraction of independent content streams (e.g., logic 211). In addition to these functions, content service 202 may also include a variety of information related to the streaming content (e.g., associated metadata and manifest files) in data store 212 to which service 202 provides access. Alternatively, such information about the streaming content, as well as the streaming content itself may be provided and/or hosted by one or more separate platforms, e.g., CDNs 218 and 220. It should be noted that, while logic 210 and 211, and data store 212 are contemplated as integrated with content service 202, implementations are contemplated in which either or both operate remotely from the associated content service. From these examples, those of skill in the art will understand the diversity of use cases to which the techniques described herein are applicable.

According to a particular implementation in which content stream abstraction logic 211 supports origin failover, each origin stack has an associated monitoring client (e.g., monitoring client 222 for origin stack 214 or monitoring client 224 for origin stack 216). Each respective monitoring client could be operating within the same data center as its origin stack and/or in direct or close communication with the stack (as indicated by the dashed arrows in FIG. 2). However, it should be noted that implementations are contemplated in which the monitoring client monitors its origin stack in a variety of ways. For example, the monitoring client could be deployed in a CDN, or even be receiving its stream of the encoded broadcast content from a CDN in a manner similar to end user client devices. Implementations are also contemplated in which the monitoring client may derive its information representing the operation of its origin stack by accumulating event messages from the client devices engaged in sessions corresponding to its stack. The scope of this disclosure should therefore not be limited with reference to particular implementations of monitoring clients.

Figure 3:
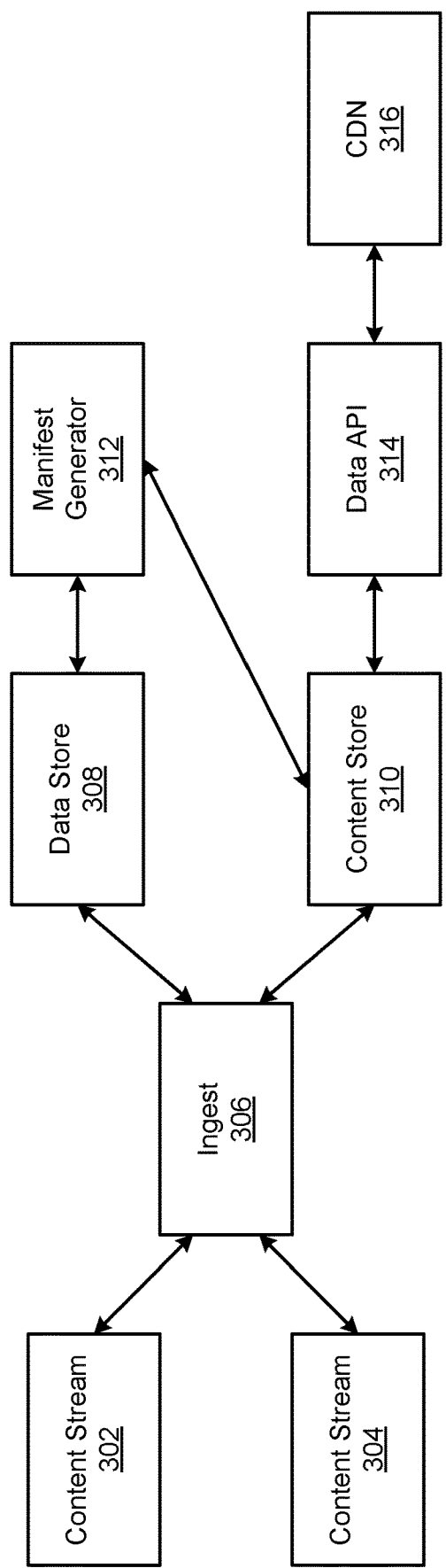
FIG. 3 is a block diagram of an implementation of a content delivery system configured to stitch content streams together as enabled by the present disclosure.

FIG. 3 is a block diagram of a particular implementation of a portion of content delivery system configured to stitch content streams together as enabled by the present disclosure. Content streams 302 and 304 are shown that represent are independently encoded and packaged using the same streaming protocol (e.g., DASH, Smooth Streaming, or HLS). As mentioned above, the content streams may be different versions of the same content, or they may represent different content. And although two content streams are shown for the sake of clarity, implementations are contemplated in which more than two content streams and/or multiple streaming protocols may be involved.

It should be noted that each of content streams 302 and 304 may represent the output of a corresponding packager as with the example described above with reference to FIGS. 1A and 1B. Alternatively, the streams may represent the outputs of corresponding encoders, with the packaging function being performed by ingest component 306 or one or more associated packagers (not shown). In addition, two content streams are depicted in FIG. 3 for the sake of clarity. However, it will be understood that implementations are contemplated in which the techniques described herein may be applied to an arbitrary number of content streams Suitable variations within the scope of this disclosure will be understood by those of skill in the art.

An ingest component 306 receives the respective content streams 302 and 304 including content fragments and associated metadata. Ingest component 306 writes the metadata to data store 308 and stores the content fragments in content store 310. According to a particular implementation that supports failover from one content stream to another, ingest component 306 also monitors health data for each of the content streams that represent the operational health of the corresponding encoder and/or packager, and/or the origin stack of which each is a part.

Figure 4:
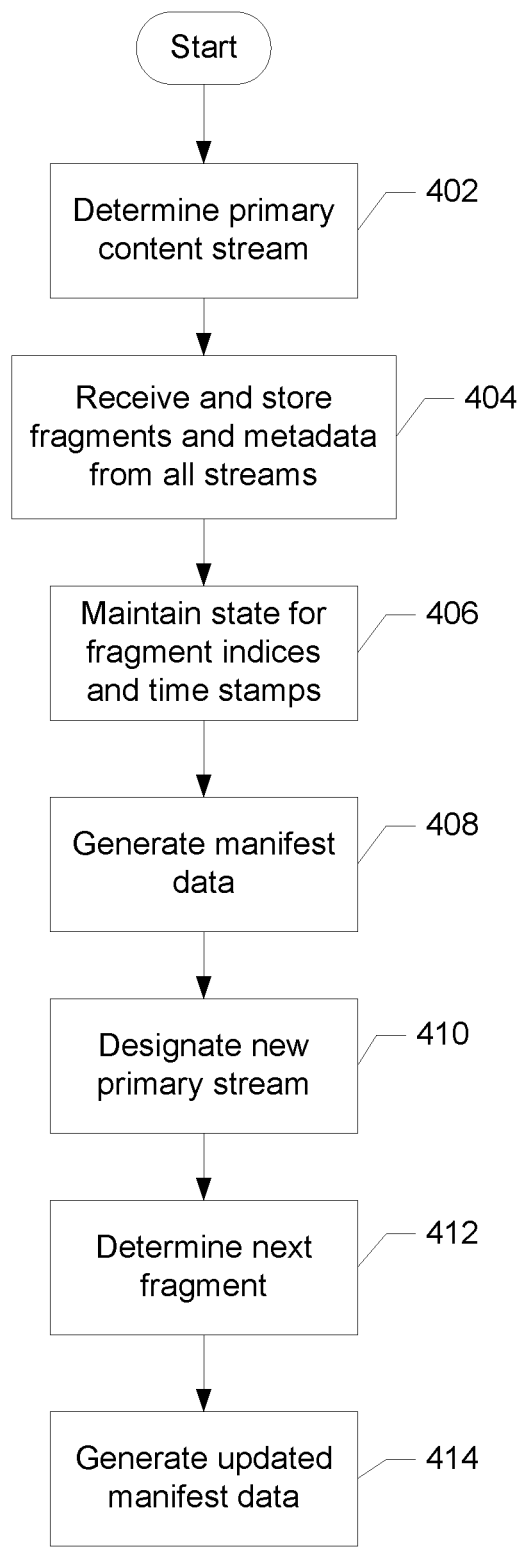
FIG. 4 is a flow diagram illustrating operation of particular implementation enabled by the present disclosure.

A manifest generator component 312 retrieves content metadata from data store 308 and generates manifest data for specific time ranges and for different packaging types, a function it performs periodically for live content. Manifest generator component 312 stores these manifests in content store 310. Manifest generator component 312 may also be configured to update the fragment references as needed. Data application programming interface (API) 314 acts as the data front end to the system, routing requests (e.g., from CDN 316) for manifest data to content store 310. The operation of a particular implementation of the system of FIG. 3 will be described with reference to the flowchart of FIG. 4.

When the system is initialized for delivery of particular content, ingest component 306 uses the health data about the content streams to determine a primary content stream (402) and begins retrieving content fragments and content metadata from all of the relevant streams for storage in content store 310 and data store 308, respectively (404). Data store 308 maintains state relating internal fragment indices and media time stamps which it uses to determine the relationships among fragments of the different content streams (406). In effect, data store 308 generates a new meaning for the fragment indices, connecting its internal indices to the corresponding indices assigned by the upstream packagers to promote a uniform view of fragment indices.

According to implementations in which the content streams represent the same content and share a common media timeline, data store 308 may use references to the common media timeline to assign its internal indices to the fragments of the different streams. For example, data store 308 can determine the time frame covered by each fragment using media time stamps and fragment durations, and correlate fragments from different streams based on their references to the common media timeline. For implementations in which there is not a shared media timeline, temporal correlations among the fragments of different streams may be determined using any of a variety of time references. For example, a "wall clock" time reference based on some external global clock can be used for this purposes. In another example, a clock associated with any of the components of the system shown in FIG. 3 might be designated as a global time reference for this purpose, e.g., origin stack components for content streams 302 or 304, ingest component 306, data store 308, etc.

Manifest generator component 312 periodically generates manifest data for a particular set of fragments from the fragment metadata in data store 308 which it then stores in content store 310 (408). This may occur, for example, as each new fragment of the content and its metadata are stored. As will be described, when the set of fragments represented in the manifest data includes references to a sequence of fragments from one stream followed by references to a sequence of fragments from another stream, manifest generator component 312 includes an indication in the manifest data that there is a discontinuity between the fragments of the first stream and those of the second. As will be discussed, the way in which the discontinuity is represented in the manifest data depends on the streaming protocol being used.

When ingest component 306 determines that a switch from one content stream to another should be made, it designates another content stream as the primary stream (410). In the context of origin stack failover, such a determination might be made in response to an indication that the operational health of the encoder or packager (or some other component of the origin stack from which the primary stream originates) is unreliable or has been compromised in some way.

According to various implementations, the determination as to whether a content stream is reliable and/or the measure (s) of reliability may vary considerably. For example, such a determination might be based on the output of media player error detection logic indicating one or more errors in the acquisition, decoding, and/or playback of the broadcast content. Such a determination might also be based on errors in the reported operational status of the stack and/or its components. The determination that the stack is unreliable might be triggered in response to one such error, multiple errors within a certain time period, an error rate, etc. And the manner in which the determination is triggered within any given implementation may vary based on the nature and/or severity of the error or the combination of errors. In another example, a stack or stack component might be determined to be unreliable only where a complete failure has been detected, e.g., responses are not received to requests for content fragments, stack components are reported as down, etc. In another example in which the stream reliability determination relies at least in part on errors reported by stack monitoring clients or even end user client devices, a stack might be determined to be unreliable when a threshold number or percentage of the clients report errors. Further variations will be apparent to those of skill in the art.

For implementations in which two content streams representing different content are being stitched together, the determination might be responsive to a control signal from the content provider, the content service, or even the player on the client device. Stitching two different content streams might be done to create a single linear content channel from two different channels. For example, views from different camera angles capturing a live event (e.g., a sporting event, a concert, etc.) could be independently encoded and packaged, and then stitched together to provide a single presentation of the live event at the client device in which the view switches among the different camera angles.

Referring back to FIG. 3, data store 308 uses the information about the new primary stream from ingest component 306 and its internal fragment indices to derive the next valid index marking the next fragment (412). When manifest generator component 312 next queries data store 308 to generate manifest data, the new manifest data include fragment references from the new stream as well as some kind of discontinuity indicator signaling the discontinuity between the new and old streams to the player (414).

Dynamic Adaptive Streaming over HTTP (DASH) is an adaptive streaming technology that enables media players on client devices to select from among differently encoded fragment options for a particular duration of content depending on various parameters or constraints such as, for example, available bandwidth. A particular content presentation is represented by a DASH Media Presentation Description (MPD), a hierarchical data structure that includes at its highest level of abstraction, the concept of a period which encompasses a particular content duration.

According to a particular class of implementations relating to DASH, a discontinuity is indicated in updated manifest data provided to a player on a client device by associating the fragment references for the new stream with a new period in the manifest data that is marked "live," while the fragment references for the old stream are associated with a previous period that is marked "complete."

In the example of FIGS. 1A and 1B, the player first receives a DASH manifest in which all of the fragment references correspond to the content stream originating from packager 104 and which might include a single period. If packager 104 or some other component of its origin stack goes down and packager 106 is the backup, a new DASH manifest is sent to the player that includes two periods. The first period (corresponding to the stream of packager 104) is marked "complete" because there will be no more content coming from the stream of packager 104 in that period. The second period (corresponding to the stream of packager 106) is marked "live" indicating that is the period for which fragments now need to be requested. The DASH player automatically handles the discontinuity as it handles any period transition.

HTTP Live Streaming (HLS) is another adaptive streaming technology that enables media players on client devices to select from among differently encoded fragment options for a particular duration of content. HLS has continuous content streams with no concept of period but employs the concept of a "presentation time" tag which is the primary identifier to support synchronization across multiple quality levels. As with the DASH media times stamps and fragment indices, this tag and the corresponding fragment sequence number are different for two independently encoded and packaged content streams of the same content.

The HLS "playlist" is a master manifest with references to sub-manifests for the different components of the presentation (e.g., video, audio, subtitles). Fragment sequence numbers and presentation times are represented in the sub-manifest along with the references to the particular fragments. The HLS media player uses this info to construct fragment requests. Sub-manifests are provided to the player periodically whenever a new fragment is added to the stream, e.g., every two seconds. When there is a switch to a different content stream (e.g., as part of a failover or insertion of secondary content), the next sub-manifest received by the player includes a discontinuity tag that indicates the discontinuity to the player and the fact that the presentation time of the last fragment preceding the discontinuity (e.g., from the stream of packager 104) will not be contiguous with the presentation time of the first fragment following the discontinuity (e.g., from the stream of packager 106). The player uses this information to handle the discontinuity and render the stream correctly.

As discussed above, two content streams representing the same live content but independently encoded may not be aligned in time. Therefore, when stitching two streams together as described herein, there is potential for the client playhead of the device consuming the combined stream to drift from the live playhead. This drift could potentially increase with each transition from one stream to another so that the client playhead gets too far behind the live playhead. This might occur, for example, for a broadcast content channel that operates 24 hours a day, seven days a week. According to various implementations enabled by the present disclosure, the extent of this drift is monitored and, if larger than some programmable threshold, measures are taken to move the client playhead closer to the live playhead.

According to a particular implementation, the overall drift attributable to successive transitions (e.g., failovers) is tracked in a data structure that includes a new addition or subtraction of time for each transition based on a comparison of the time stamps or presentation times associated with the last fragment of the old stream and the first fragment of the new stream. As will be appreciated, because both overlaps and gaps between these fragments may occur, the components of the drift attributable to each transition may tend to balance out over time. However, if the drift gets too large and therefore too far behind the live playhead, content can be skipped to allow the client playhead to "catch up" to the live playhead.

For example, in implementation in which fragment duration is constant, e.g., 2 seconds, the catch up can be triggered when the tracked drift reaches some integer multiple of the fragment duration and so can be remedied by skipping one or more complete fragments. Alternatively, the catch up can be triggered every time there is a transition between content streams that results in an increase in the drift. In any case, tracking of and compensating for the drift might be done, for example, as part of the state maintenance performed by data store 308 and as part of identifying the fragment of the new stream that follows the last fragment of the old stream.

According to some implementations, a more precise approach to skipping content may be employed to reduce the visual perceptibility of the transition. For example, the beginning of the playback of the new stream can be aligned with the end of the playback of the old stream by determining the frame of the first fragment of the new stream at which playback should begin. This might be done, for example, using the time stamps or presentation times of the individual frames of the last fragment of the old stream and the first fragment of the new stream to identify which frame of the first fragment of the new stream follows the last played frame of the old stream. The beginning frames of the first fragment of the new stream preceding that frame could then be dropped during playback.

The dropping of frames within the first fragment of the new stream may be accomplished with an instruction to the media player to begin playback at a frame in the first fragment of the new stream having a particular time stamp or presentation time. Alternatively, the first fragment of the new stream can be modified on the server side before transmission to the client. For example, in the implementation of FIG. 3, ingest component 306 might be configured to decode the first fragment of the new content stream and identify the appropriate frames of that fragment to drop (paying attention to the dependencies among the frames).

In the context of DASH, a specific DASH tag may be employed that indicates to the media player how much time has passed in the media presentation and therefore where to start in the new period representing the new content stream. This value can be manipulated (e.g., with an offset) to automatically account for the cumulative drift.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more computing devices configured to:
   generate a first content stream, the first content stream comprising a first sequence of content fragments having corresponding fragment indices;
   generate a second content stream independently of the first content stream, the second content stream comprising a second sequence of content fragments having corresponding fragment indices, wherein the fragment indices of the first content stream and the second content stream are uncorrelated, wherein the first content stream is based on a first media presentation and the second content stream is based on a second media presentation, wherein the first media presentation and the second media presentation represent different content;
   determine one or more temporal correlations among the content fragments of the first and second content streams;
   generate stream abstraction data based on the one or more temporal correlations, the stream abstraction data representing one or more relationships between the temporally correlated content fragments of the first and second content streams;
   generate first manifest data, the first manifest data being configured to enable a client device to request content fragments associated with the first content stream as part of a single streaming session; and
   generate updated manifest data using the stream abstraction data, the updated manifest data being configured to enable the client device to transition to requesting content fragments associated with the second content stream as part of the single streaming session, the updated manifest data indicating a discontinuity between the content fragments of the first content stream and the content fragments of the second content stream, the indication of the discontinuity being configured to enable the client device to handle the fragment indices being uncorrelated.

2. The system of claim 1, wherein the first content stream is generated by a first origin stack that encodes live content from a content source, and wherein the second content stream is generated by a second origin stack that encodes the live content from the content source, and wherein the one or more computing devices are configured to determine that the client device should transition from the first content stream to the second content stream.

3. The system of claim 1, wherein the one or more computing devices are further configured to:
   generate a third content stream independently of the second content stream, content fragments of the second and third content streams having corresponding fragment indices that are uncorrelated; and
   determine one or more temporal correlations among the content fragments of the second and third content streams;
   wherein the stream abstraction data also represents one or more relationships among the temporally correlated content fragments of the second and third content streams, wherein the updated manifest data are configured to enable the client device to request content fragments associated with the third content stream as part of the single streaming session, and wherein the updated manifest data indicate a discontinuity between the content fragments of the second content stream and the content fragments of the third content stream.

4. The system of claim 1, wherein the first content stream and the second content stream correspond to Dynamic Adaptive Streaming over HTTP (DASH), and wherein the indication of the discontinuity uses a first period to represent the content fragments of the first content stream and a second period to represent the content fragments of the second content stream.

5. The system of claim 1, wherein the first content stream and the second content stream correspond to HTTP Live Streaming (HLS), and wherein the indication of the discontinuity uses a discontinuity tag.

6. The system of claim 1, wherein the first content stream and the second content stream both correspond to live content, wherein the live content is characterized by a live playhead, wherein the first content stream is characterized by a first delay relative to the live playhead, wherein the second content stream is characterized by a second delay relative to the live playhead, and wherein the one or more computing devices are configured to determine a third delay relative to the live playhead caused by a transition from the first content stream to the second content stream based, at least in part, on the first and second delays.

7. The system of claim 6, wherein the one or more computing devices are configured to:
   determine that the third delay is greater than a threshold; and
   cause the client device to skip playback of at least a portion of a first fragment of the second content stream.

8. The system of claim 1, wherein the one or more temporal correlations among the content fragments of the first and second content streams are based on a common media timeline shared by the first and second content streams.

9. The system of claim 1, wherein the one or more temporal correlations among the content fragments of the first and second content streams are based on a clock reference separate from media timelines associated with the first and second content streams.

10. A computer-implemented method, comprising:
    generating a first content stream, the first content stream comprising a first sequence of content fragments having corresponding fragment indices;
    generating a second content stream independently of the first content stream, the second content stream comprising a second sequence of content fragments having corresponding fragment indices, wherein the fragment indices of the first content stream and the second content stream are uncorrelated, wherein the first content stream is based on a first media presentation and the second content stream is based on a second media presentation, wherein the first media presentation and the second media presentation represent different content;
    determining one or more temporal correlations among the content fragments of the first and second content streams;
    generating stream abstraction data based on the one or more temporal correlations, the stream abstraction data representing one or more relationships between the temporally correlated content fragments of the first and second content streams;

generate first manifest data, the first manifest data being configured to enable a client device to request content fragments associated with the first content stream as part of a single streaming session; and generating updated manifest data using the stream abstraction data, the updated manifest data being configured to enable the client device to transition to requesting content fragments associated with the second content stream as part of the single streaming session, the updated manifest data indicating a discontinuity between the content fragments of the first content stream and the content fragments of the second content stream, the indication of the discontinuity being configured to enable the client device to handle the fragment indices being uncorrelated.

11. The method of claim 10, wherein the first content stream is generated by a first origin stack that encodes live content from a content source, and wherein the second content stream is generated by a second origin stack that encodes the live content from the content source, the method further comprising determining that the client device should transition from the first content stream to the second content stream.

12. The method of claim 10, further comprising:

generating a third content stream independently of the second content stream, content fragments of the second and third content streams having corresponding fragment indices that are uncorrelated; and determining one or more temporal correlations among the content fragments of the second and third content streams;

wherein the stream abstraction data also represents one or more relationships among the temporally correlated content fragments of the second and third content streams, wherein the updated manifest data are configured to enable the client device to request content fragments associated with the third content stream as part of the single streaming session, and wherein the updated manifest data indicate a discontinuity between the content fragments of the second content stream and the content fragments of the third content stream.

13. The method of claim 10, wherein the first content stream and the second content stream correspond to Dynamic Adaptive Streaming over HTTP (DASH), and wherein the indication of the discontinuity uses a first period to represent the content fragments of the first content stream and a second period to represent the content fragments of the second content stream.

14. The method of claim 10, wherein the first content stream and the second content stream correspond to HTTP Live Streaming (HLS), and wherein the indication of the discontinuity uses a discontinuity tag.

15. The method of claim 10, wherein the first content stream and the second content stream both correspond to live content, wherein the live content is characterized by a live playhead, wherein the first content stream is characterized by a first delay relative to the live playhead, wherein the second content stream is characterized by a second delay relative to the live playhead, the method further comprising determining a third delay relative to the live playhead caused by a transition from the first content stream to the second content stream based, at least in part, on the first and second delays.

16. The method of claim 15, further comprising:

determining that the third delay is greater than a threshold; and causing the client device to skip playback of at least a portion of a first fragment of the second content stream.

17. The method of claim 10, wherein the one or more temporal correlations among the content fragments of the first and second content streams are based on a common media timeline shared by the first and second content streams.

18. The method of claim 10, wherein the one or more temporal correlations among the content fragments of the first and second content streams are based on a clock reference separate from media timelines associated with the first and second content streams.

* * * * *